March 1, 1966 P. WISE 3,237,676
TIRE TOOL
Filed July 1, 1963 2 Sheets-Sheet 1
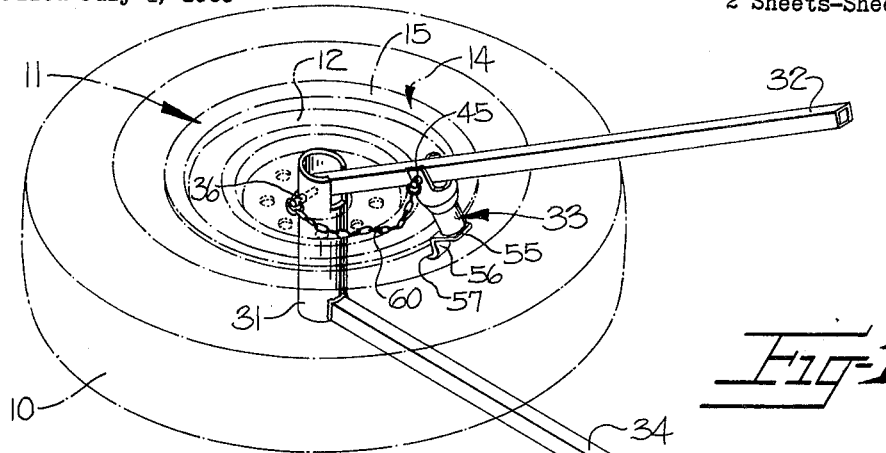
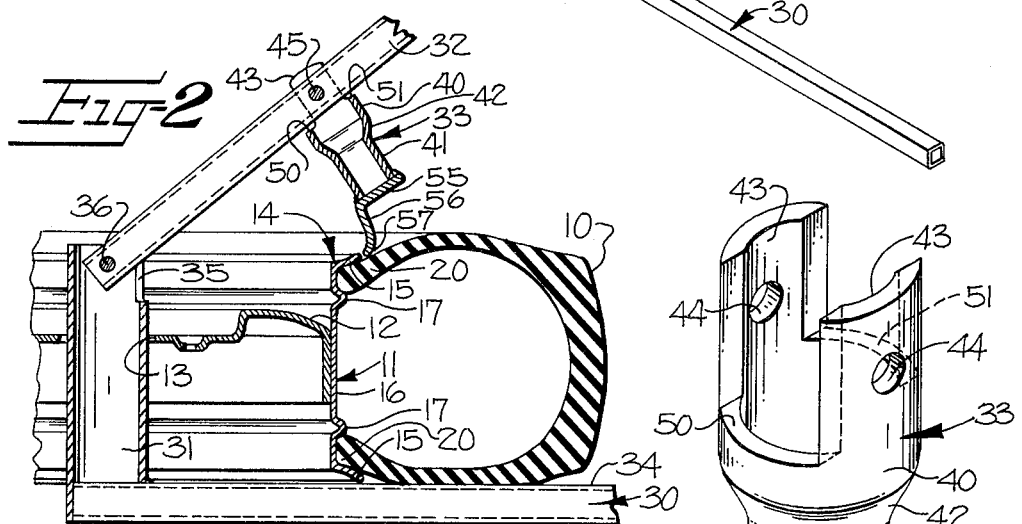
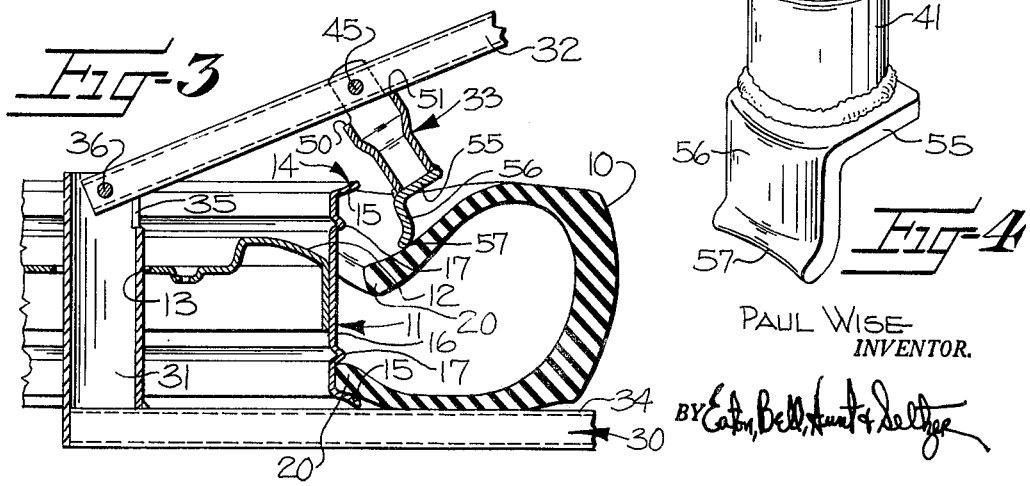
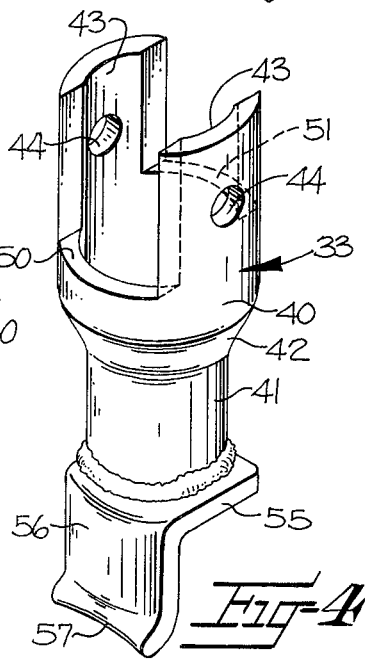
PAUL WISE
INVENTOR.
BY Eaton, Bell, Hunt & Seltzer
ATTORNEYS March 1, 1966      P. WISE      3,237,676
TIRE TOOL Filed July 1, 1963      2 Sheets-Sheet 2

INVENTOR.
PAUL WISE
BY
Eaton, Bell, Hunt & Seltzer
ATTORNEYS

United States Patent Office 3,237,676
Patented Mar. 1, 1966

3,237,676
TIRE TOOL
Paul Wise, Rte. 4, Box 950, Hickory, N.C.
Filed July 1, 1963, Ser. No. 291,847
2 Claims. (Cl. 157—1.26)

This invention relates to improvements in a tire tool. More particularly, the present invention concerns improvements in a tool of the type for loosening a tire from the rims of a vehicle wheel through the manipulation of a hand-operated lever arm to facilitate removal of the tire from the vehicle wheel and constitutes a continuation-in-part of the subject matter disclosed and claimed in my co-pending United States patent application, Serial Number 232,509, filed October 23, 1962, now abandoned.

A vehicle wheel is commonly provided with annular rims on opposite sides thereof for receiving the bead portions of a tire therebeneath when the tire is positioned on the wheel. In removing the tire from the wheel, the bead portions of the tire must be disengaged from the rims of the wheel by initially forcing the bead portions inwardly and away from the rims to permit subsequent tilting of the wheel with respect to the tire, whereupon the wheel and tire may be pulled apart. The task of separating the bead portions of the tire from the rims of the wheel is extremely difficult to accomplish without the use of a suitable tool.

Various forms of tire tools which are useful in removing a tire from a vehicle wheel have been proposed, but many of these tire tools are not suitable for use with a tire mounted on a vehicle wheel having a unitary rim construction which is perhaps the most common type of wheel found on a vehicle at the present time. Tire tools which can be used to assist in removing a tire from a vehicle wheel having a unitary rim construction are characteristically unwieldy and pose an alinement problem regarding their proper positioning in an operative relationship with respect to the wheel and the tire mounted thereon. Often, such tire tools are supported in an uncertain manner during the operation thereof by being hooked onto some portion of the vehicle wheel and may be repeatedly disengaged from the portion of the wheel to which they are hooked for support—causing loss of time and considerable annoyance.

It is therefore an object of this invention to provide an improved tire tool of simple construction which can be relied upon to loosen a tire from the rims of a vehicle wheel to facilitate removal of the tire from the wheel, while retaining an operative position supported by the wheel and the tire during the operation thereof.

It is another object of this invention to provide an improved tire tool having an upright standard adapted to extend through the centrally disposed axle opening of a vehicle wheel for properly alining the tire tool in operative relationship to the vehicle wheel and a tire mounted thereon, with a base arm and a lever arm respectively connected to opposite end portions of the standard and extending outwardly therefrom on opposite sides of the vehicle wheel and the tire mounted thereon, wherein the lever arm is pivotally movable in a direction toward the vehicle wheel and carries a dependent tire iron for disengaging a bead portion of the tire from a rim of the vehicle wheel.

It is another object of this invention to provide an improved tire tool of the type having a pivotable lever arm which is provided with a depending tire iron pivotally connected thereto intermediate the ends of the lever arm and adapted to separate a bead portion of a tire from a rim of a vehicle wheel upon pivotal movement of the lever arm in a direction moving the tire iron against the bead portion of the tire, wherein the tire iron is so constructed as to include a cam shoulder thereon adapted to ride against the lever arm during movement of the tire iron against the bead portion caused by the pivoting movement of the lever arm to impart an added inwardly directed thrust to the tire iron as the pivoting movement of the lever arm continues, resulting in improved penetration of the tire iron between the bead portion of the tire and the rim of the wheel.

It is another object of this invention to provide an improved tire tool having an upright standard adapted to extend through the centrally disposed axle opening of a vehicle wheel for properly alining the tire tool in operative relationship to the vehicle wheel and a tire mounted thereon, with a base arm and a lever arm respectively connected to opposite end portions of the standard and extending outwardly therefrom on opposite sides of the vehicle wheel and the tire mounted thereon, wherein the lever arm is directly pivotably connected to the upper end portion of the standard and carries a dependent tire iron for disengaging a bead portion of the tire from a rim of the vehicle wheel.

It is another object of this invention to provide an improved tire tool having an upright standard adapted to extend through the centrally disposed axle opening of a vehicle wheel for properly alining the tire tool in operative relationship to the vehicle wheel and a tire mounted thereon, wherein a base arm is connected to one end portion of the standard and extends outwardly therefrom on one side of the vehicle wheel and the tire mounted thereon, and a lever arm is connected to the opposite end portion of the standard by a connector link interposed therebetween, with the connector link and the lever arm extending outwardly of the standard on the other side of the vehicle wheel and the tire mounted thereon, the lever arm being pivotally connected at its inner end to the connector link and carrying a dependent tire iron for disengaging a bead portion of the tire from a rim of the vehicle wheel, and the connector link acting as a stationary bar on the standard extending radially outwardly therefrom as pivotal movement of the lever arm proceeds in a direction moving the tire iron against the bead portion of the tire, thereby providing for an increased mechanical advantage of the tire tool in disengaging a bead portion of the tire from the rim of the vehicle wheel by continued pivotal movement of the lever arm forcing the tire iron against the bead portion of the tire.

Some of the objects of the invention having been stated, other objects will appear as the description proceeds, when taken in connection with the accompanying drawings, in which—

FIGURE 1 is a perspective view of one embodiment of the improved tire tool in accordance with the present invention, the tire tool being arranged in an operative position, with a vehicle wheel and a tire mounted thereon being shown in phantom lines to illustrate the use of the tire tool;

FIGURE 2 is an enlarged fragmentary vertical sectional view of a tire mounted on a vehicle wheel with the tire tool of FIGURE 1 being used thereon;

FIGURE 3 is an enlarged fragmentary vertical sectional view, similar to FIGURE 2, but showing a further advanced stage of the operation of the tire tool illustrated in FIGURE 1 in loosening the tire from a rim of the vehicle wheel;

FIGURE 4 is a greatly enlarged perspective view of the tire iron component of the improved tire tool;

Figure 5:
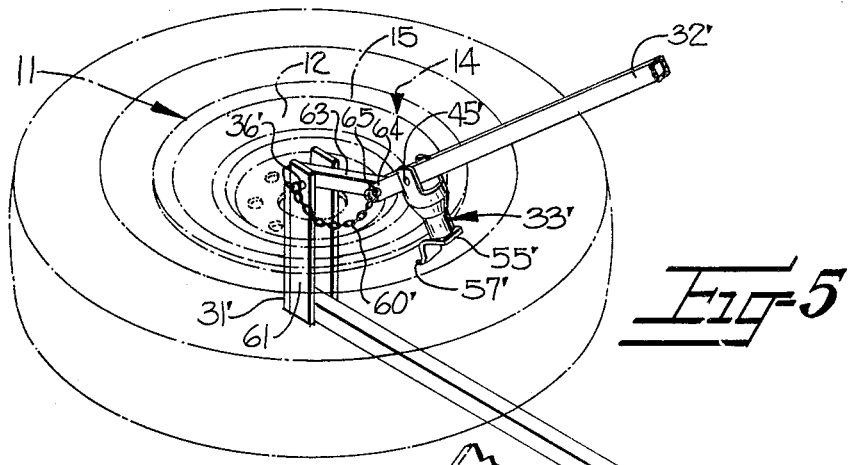
FIGURE 5 is a perspective view, similar to FIGURE 1, but showing another embodiment of the improved tire tool in accordance with the present invention as arranged in an operative position, with a vehicle wheel and a tire mounted thereon being shown in phantom lines to illustrate the use of the tire tool.

Referring more specifically to the drawings, it will be understood that the improved tire tool in accordance with the present invention is adapted to be used in removing a tire 10 from a vehicle wheel 11 of the type having an inner disk 12 provided with a centrally disposed axle opening 13 therein and an annular rim assembly 14 forming the periphery of the vehicle wheel 11 and around which the tire 10 is mounted.

The annular rim assembly 14 includes a pair of transversely spaced annular rims 15, 15 located on the opposite sides of the wheel 11, the rims 15, 15 being connected by a central web 16. A pair of annular radially outwardly extending ribs 17, 17 are formed on the web 16 in spaced apart relationship near the oppositely disposed marginal portions thereof joined to the rims 15, 15.

The tire 10, which may be the tubeless type or the inner tube type (not shown), is provided with radially inwardly disposed bead portions 20, 20 on the opposite sides thereof, the bead portions 20, 20 being adapted to be respectively disposed within the rims 15, 15. Inflation of the tire 10 causes the bead portions 20, 20 thereof to be forced outwardly by pressure into tight engagement with the rims 15, 15. The ribs 17, 17 on the web 16 of the rim assembly 14 are accordingly disposed inwardly of the bead portions 20, 20 (as in FIGURES 2 and 6) and act as stop means to restrict inward movement of the bead portions 20, 20 of the tire 10 toward each other for retaining the bead portions 20, 20 against the rims 15, 15. The tire 10 normally remains in an inflated state, while in a mounted position about the annular rim assembly 14 of the wheel 11, over a relatively long period of time during which a progressively increasing degree of adhesion develops between the bead portions 20, 20 of the tire 10 and the rims 15, 15.

When it is desired to remove the tire 10 from the wheel 11, the tire 10 is deflated, but the adhesion which has developed between the rims 15, 15 of the wheel 11 and the bead portions 20, 20 of the tire 10 must be broken before the tire 10 can be removed from the wheel 11. To this end, the present invention is embodied in an improved tire tool of simple construction which can be used to break the adhesion between the rims 15, 15 of the wheel 11 and the bead portions 20, 20 of the tire 10 to loosen the tire 10 for disengagement of the bead portions 20, 20 from the rims 15, 15 and subsequent removal of the tire 10 from the wheel 11.

In the embodiment of the improved tire tool illustrated in FIGURES 1–3, inclusive, the tire tool comprises a base member in the form of an elongate base arm or rod 30, an upright standard or upwardly extending vertical post 31 on one end of the base arm 30, a hand-operated lever in the form of an elongate lever arm 32 pivotally connected about one end thereof to the upper end portion of the post 31, and a tire iron 33 pivotally connected at its upper end to the lever arm 32 intermediate the ends thereof to depend from the lever arm 32.

It will be observed that the base arm 30 is adapted to be positioned beneath the tire 10 and the vehicle wheel 11 with its inner end rigidly secured to the lower end of the post 31. The post 31 is arranged to extend through the centrally disposed axle opening 13 of the wheel 11 for properly alining the tire tool in an operative position with respect to the wheel 11 and the tire 10. The base arm 30 extends radially outwardly with respect to the wheel 11 and the tire 10 beyond the periphery of the tire 10 and includes an upper tire-engaging surface 34 which is disposed across the radius of the tire 10 (see FIGURES 2 and 3).

The post 31 comprises an upright cylinder having a diameter substantially conforming to the diameter of the centrally disposed axle opening 13 in the wheel 11 to prevent any appreciable degree of lateral shifting between the wheel 11 with the tire 10 mounted thereon and the tire tool. The upper end portion of the cylindrical post 31 is provided with an upwardly opening cut-out slot 35 for receiving the inner end of the lever arm 32 within the upper end of the cylindrical post 31 in a position above the wheel 11 and the tire 10.

As previously noted, the inner end of the lever arm 32 is pivotally connected to the upper end portion of the cylindrical post 31. In this connection, a removable pivot pin 36 is carried by the cylindrical post 31 at the upper end portion thereof, the pin 36 extending transversely through the post 31 so as to penetrate the inner end of the lever arm 32 within the interior of the post 31.

The tire iron 33 comprises a body portion of stepped cylindrical configuration, there being an upper enlarged cylindrical body section 40 and a lower cylindrical body section 41 of reduced diameter joined together by an integral intermediate tapered body section 42. The enlarged cylindrical body section 40 of the tire iron 33 is provided with an upper bifurcated end which forms a pair of upwardly extending legs 43, 43 thereon. Alined apertures 44, 44 are formed in the upwardly extending legs 43, 43 of the tire iron 33, and the upper end of the tire iron 33 is pivotally connected to the lever arm 32 intermediate the ends thereof by a pivot pin 45 extending transversely through the lever arm 32 and received within the apertures 44, 44 formed in the legs 43, 43 of the tire iron 33 which straddle the lever arm 32.

It will be observed that the forward and rear shoulders 50, 51 formed by the bifurcation of the upper end of the enlarged cylindrical body section 40 of the tire iron 33 and extending between the upwardly extending legs 43, 43 are of unequal height. In this respect, the rear shoulder 51 is higher than the forward shoulder 50 and defines a raised cam shoulder, as will be subsequently described.

The tire iron 33 further includes an L-shaped member connected to the lower end of the reduced cylindrical body section 41, the L-shaped member comprising a mounting flange 55 rigidly secured to the reduced cylindrical body section 41 and a dependent vertical leg 56 terminating in an inwardly directed curved lip 57 adapted to penetrate between a bead portion 20 of the tire 10 and a rim 15 of the wheel 11 adhered thereto to subsequently force the bead portion 20 away from the rim 15.

Preferably, the pivot pin 45 connecting the tire iron 33 to the lever arm 32 is joined to the pivot pin 36 connecting the inner end of the lever arm 32 to the upper end portion of the cylindrical post 31 by a chain 60, with the pivot pin 36 being readily removable from the cylindrical post 31 and the inner end of the lever arm 32 to disengage these latter two elements so that the lever arm 32 and the tire iron 33 may be withdrawn from their normal operative position above the vehicle wheel 11 and the tire 10 to facilitate pulling apart the vehicle wheel 11 and the tire 10 after the tire tool has been used to loosen a bead portion 20 of the tire 10 from the rim 15 of the wheel 11 corresponding thereto. The pivot pin 45 connecting the tire iron 33 and the lever arm 32, on the other hand, is firmly, although releasably, secured in place, and the chain 60 joining the two pivot pins 45 and 36 prevents inadvertent loss of the pin 36 when it has been removed from the cylindrical post 31 and the inner end of the lever arm 32.

In operating the embodiment of the tire tool illustrated in FIGURES 1–3, inclusive, the vehicle wheel 11 and the tire 10 mounted thereon are first disposed on top of the base arm 30 with the cylindrical post 31 received through the centrally disposed axle opening 13 of the wheel 11. The lever arm 32 carrying the tire iron 33 is then pivotally connected at its inner end to the upper end portion of the cylindrical post 31 by inserting the pivot pin 36 transversely through the post 31 and the inner end of the lever arm 32. Thereafter, the inwardly directed curved lip 57 of the tire iron 33 is positioned on the tire 10 where the bead portion 20 of the tire 10 extends within the rim 15 (FIGURE 2). The lever arm 32 is then manually pivoted in a downward arc about its inner end to lower the tire iron 33, moving the lip 57 thereof toward the base arm 30 of the tire tool which is vertically alined with the lever arm 32 and applying a downward force to the tire iron 33. Continued application of this downward force to the tire iron 33 through the continued pivotal movement of the lever arm 32 in a downward arc causes the inwardly directed lip 57 to penetrate between the bead portion 20 of the tire 10 and the rim 15 of the wheel 11 and to force the bead portion 20 of the tire 10 inwardly past the retaining rib 17 and away from the rim 15. This operation is repeated, as often as necessary at various positions about the circumference of the rim 15 by rotating the tire 10 and the wheel 11 on which it is mounted about the cylindrical post 31. The wheel 11 and the tire 10 mounted thereon may also be turned over to permit the tire tool to be applied to the bead portion 20 on the opposite side of the tire 10 to force the opposite bead portion 20 away from the rim 15 corresponding thereto.

Referring to FIGURE 3, it will be observed that the raised rear shoulder 51 formed on the bifurcated upper end of the tire iron 33 may, in some instances, come into play as a cam shoulder wherein the lever arm 32 during its downward pivotal movement is brought into engagement with the raised rear shoulder 51 of the tire iron 33 to impart an added inwardly directed thrust to the tire iron 33 for assisting the lip 57 in penetrating between the bead portion 20 of the tire 10 and the rim 15 of the wheel 11 and in forcing the bead portion 20 inwardly of the rim 15. Thus, in instances where abutment occurs between the raised rear shoulder 51 of the bifurcated upper end of the tire iron 33 and the lever arm 32, it will be understood that further outward pivoting movement of the tire iron 33 with respect to the lever arm 32 is restrained so as to impart an inwardly directed thrust to the tire iron 33 as the downward pivotal movement of the lever arm 32 is continued.

Figure 6:
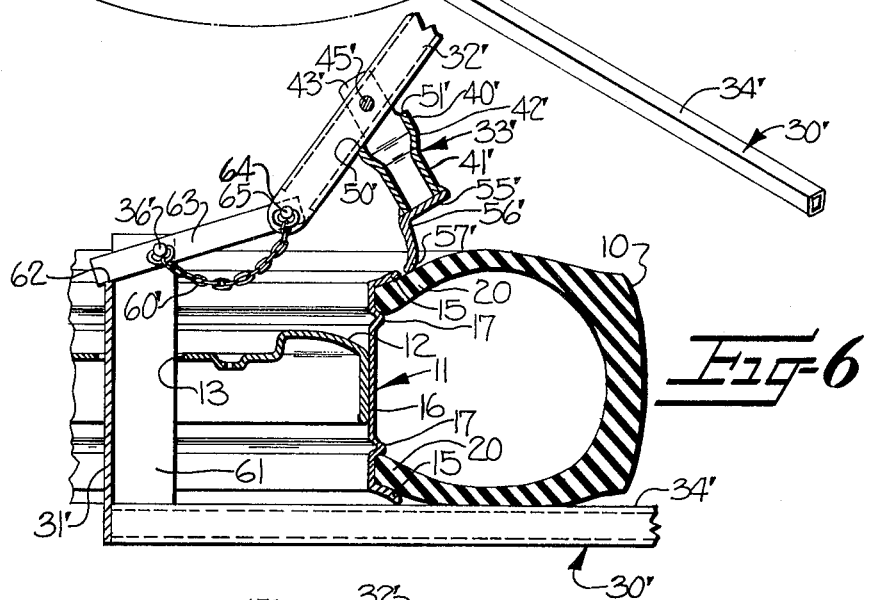
FIGURE 6 is an enlarged fragmentary vertical sectional view of a tire mounted on a vehicle wheel with the tire tool of FIGURE 5 being used thereon.
Figure 7:
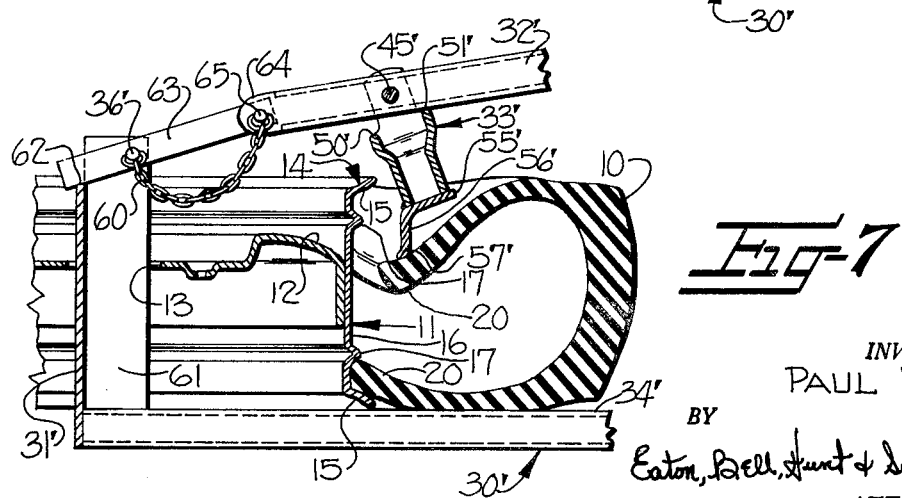
FIGURE 7 is an enlarged fragmentary vertical sectional view, similar to FIGURE 6, but showing a further advanced stage of the operation of the tire tool illustrated in FIGURE 5 in loosening the tire from a rim of the vehicle wheel.

Referring to the embodiment of the improved tire tool illustrated in FIGURES 5-7, inclusive, it will be seen that the tire tool therein shown generally conforms to the previously described embodiment of the tire tool illustrated in FIGURES 1-3, inclusive. Therefore, the same reference numerals with the prime notation added have been used to identify components of the tire tool illustrated in FIGURES 5-7, inclusive, which correspond to components of the tire tool shown in FIGURES 1-3, inclusive. The base arm 30' of the modified tire tool is adapted to be positioned beneath the tire 10 and the vehicle wheel 11 with its inner end rigidly secured to the lower end of the upright standard 31' which is arranged to extend through the centrally disposed axle opening 13 of the wheel 11 for properly alining the tire tool in an operative position with respect to the wheel 11 and the tire 10.

The upright standard 31' comprises a vertically arranged channel member 61 having the channel therein opening in the direction of the base arm 30', the inner end of the base arm 30' being fixedly secured within the channel of the vertical channel member 61 at the lower end portion thereof. The channel member 61 is provided with a transverse cross-section of a size substantially approximating the diameter of the centrally disposed axle opening 13 in the wheel 11 to prevent any appreciable degree of lateral shifting between the wheel 11 with the tire 10 mounted thereon and the modified tire tool. An upwardly opening cut-out slot 62 is formed in the upper end portion of the channel member 61, the slot 62 being located in the web connecting the opposite legs of the channel member 61.

The cut-out slot 62 is adapted to receive the inner end of a relatively short connector link 63 therethrough, the connector link 63 passing through the upper end portion of the vertical channel member 61 and being pivotally connected thereto intermediate its ends. In the latter respect, a removable pivot pin 36' is carried by the channel member 61 at the upper end portion thereof, the pin 36' extending transversely through the oppositely disposed legs of the channel member 61 so as to penetrate the connector link 63 intermediate the ends thereof for pivotally connecting the link 63 to the upper end portion of the channel member 61.

The inner end of the lever arm 32' is itself pivotally connected to the outer end of the connector link 63 so as to be connected to the upright channel member 61 by the connector link 63 interposed therebetween for pivotal movement of the lever arm 32' with respect to the upper end portion of the channel member 61. In this connection, the inner end of the lever arm 32' terminates in a clevis or yoke 64 which receives the outer end of the connector link 63 therewithin in straddling relationship, and a removable pivot pin 65 is carried by the yoke 64 to extend transversely through the outer end of the connector link 63 for pivotally securing the inner end of the lever arm 32' thereto.

The tire iron 33' may be identical to the tire iron 33 illustrated in FIGURE 4, the upper end of the tire iron 33' being pivotally connected to the lever arm 32' intermediate the ends thereof by a pivot pin 45' extending transversely through the lever arm 32' and received within the apertures 44', 44' formed in the legs 43', 43' of the tire iron 33' which straddle the lever arm 32'.

A chain 60' interconnects the pivot pins 36' and 65, the pivot pins 36' and 65 being respectively secured to the opposite ends of the chain 60'. The pivot pin 36' is preferably readily removable from the channel member 61 and the connector link 63 to disengage these latter two elements so that the connector link 63, the lever arm 32', and the tire iron 33' carried by the lever arm 32' may be withdrawn from their normal operative position above the vehicle wheel 11 and the tire 10 to facilitate pulling apart the vehicle wheel 11 and the tire 10 after the modified tire tool has been used to loosen a bead portion 20 of the tire 10 from the rim 15 of the wheel 11 corresponding thereto. In the modified tire tool, the pivot pin 65 may also be readily removable to disconnect the connector link 63 and the lever arm 32', whereupon the connector link 63 is permitted to swing downwardly about the pivot pin 36' for reception within the channel of the channel member 61 so that the vehicle wheel 11 and the tire 10 may be pulled apart upon withdrawal of the disconnected lever arm 32' and the tire iron 33' carried thereby following use of the modified tire tool. It will be understood, however, that only one of the pivot pins 36' and 65 is intended to be removed in each instance following use of the modified tire tool for the purpose described, so that the chain 60' joining the two pivot pins 36' and 65 will serve to prevent the inadvertent loss of the pin which has been removed.

The modified tire tool of FIGURES 5-7, inclusive, is operated in substantially the same manner as the tire tool of FIGURES 1-3, inclusive, to disengage a bead portion 20 of the tire 10 from the rim 15 of the wheel 11 corresponding thereto. In the modified tire tool, the connector link 63 is responsible for an increased mechanical advantage to further facilitate the operation of the modified tire tool. In this respect, the link 63 permits the pivotal connection at the inner end of the lever arm 32' forming the fulcrum about which the lever arm 32' is effective to be moved closer to the tire iron 33' which is to perform the work. The modified tire tool is operated by initially positioning the inwardly directed curved lip 57' of the tire iron 33' on the tire 10 where the bead portion 20 of the tire 10 extends within the rim 15 (FIGURE 6). The lever arm 32' is then manually pivoted in a downward arc about its inner end which is pivotally connected to the outer end of the connector link 63. During the progress of this downward pivotal movement of the lever arm 32', the inner end of the connector link 63 is brought into abutment with the bottom wall of the cut-out slot 62 formed in the upper end portion of the channel member 61. Thereafter, the connector link 63 acts as a stationary extension bar projecting radially outwardly of the channel member 61, and the fulcrum for the lever arm 32' is disposed at the pivotal connection between the inner end of the lever arm 32' and the outer end of the connector link 63, since the pivotal connection between the link 63 and the upper end portion of the channel member 61 is effectively frozen by the abutment of the inner end of the link 63 with the bottom wall of the cut-out slot 62 in the upper end portion of the channel member 61. In this way, the fulcrum of the lever arm 32' can be moved closer to the tire iron 33', and the mechanical advantage of the modified tire tool is thereby increased. Continued pivotal movement of the lever arm 32' in a downward arc, following the immobilization of the connector link 63 causes the inwardly directed lip 57' of the tire iron 33' to penetrate between the bead portion 20 of the tire 10 and the rim 15 of the wheel 11 and to force the bead portion 20 of the tire 10 inwardly past the retaining rib 17 and away from the rim 15 in the same manner described in connection with the embodiment of the tire tool illustrated in FIGURES 1–3, inclusive.

It will be further understood that the rear shoulder 51' formed on the bifurcated upper end of the tire iron 33' is effective in the same way as the rear shoulder 51 of the tire iron 33 to provide a cam shoulder, in some instances, where the lever arm 32' during its downward pivotal movement is brought into engagement with the rear shoulder 51' to impart an added inwardly directed thrust to the tire iron 33' for assisting the lip 57' in penetrating between the bead portion 20 of the tire 10 and the rim 15 of the wheel 11 and in forcing the bead portion 20 inwardly of the rim 15.

It will be understood that each embodiment of the tire tool herein shown may be suitably used on vehicle wheels having tires mounted thereon of various sizes. In this latter respect, provision may be made by means (not shown) to adjust the position of the tire iron along the length of the lever arm to correspond with the particular size of the tire to be removed from a vehicle wheel so that proper dimensional relationships are present to provide for the camming action of the raised rear shoulder on the bifurcated upper end of the tire iron in instances where such camming action is found to be necessary to force a bead portion 20 of the tire 10 inwardly and away from the rim 15 of the vehicle wheel 11 corresponding thereto.

In the drawings and specification there have been set forth preferred embodiments of the invention and although specific terms are employed, they are used in a generic and descriptive sense only and not for purposes of limitation, the scope of the invention being defined in the claims.

I claim:
1. A tool for loosening the bead portions of a tire from the rim assembly of a vehicle wheel having a centrally disposed axle opening, said tool comprising
   (a) an elongate base arm adapted to be disposed beneath the tire and the vehicle wheel to extend radially outwardly from the centrally disposed axle opening beyond the periphery of the tire, said base arm having a tire-engaging surface for extending across the radius of the tire,
   (b) an upright standard on the inner end of said base arm receivable through the centrally disposed axle opening of the vehicle wheel,
   (c) an elongate lever arm,
   (d) a connector link having an inner end portion and an outer end portion,
   (e) means pivotally connecting said connector link to the upper end portion of said standard for pivotal movement in opposite directions between a first position wherein said connector link projects substantially normally outwardly from said standard with said inner end portion thereof abutting the upper end portion of said standard and a second position wherein said connector link extends generally parallel to said standard,
   (f) removable means pivotally connecting said outer end portion of said connector link and the inner end of said lever arm for detachably connecting said lever arm to the upper end portion of said standard,
   (g) a tire iron having a bifurcated upper end defining upwardly extending legs thereon,
   (h) a lateral shoulder on said tire iron extending between said upwardly extending legs and positioned at the rear end portions of said legs,
   (i) means pivotally connecting said tire iron at its bifurcated upper end to said lever arm intermediate the ends thereof with the legs of said tire iron straddling said lever arm,
   (j) said tire iron depending from said lever arm and having an inwardly directed curved lip in vertical alinement with said base arm for engagement with the bead portion of the tire adjacent the upwardly disposed rim of the vehicle wheel,
   (k) said connector link being pivotally movable into said first position thereof and maintained therein by abutment with the upper end portion of said standard so that the connector link acts as a stationary substantially normally-projecting extension of said standard in response to pivotal movement of said lever arm about its inner end in a direction moving said lip of the tire iron toward said base arm,
   (l) continued pivotal movement of said lever arm in the same direction causing said lip to force the bead portion of the tire downwardly and away from the upwardly disposed rim of the vehicle wheel, and
   (m) said shoulder on said tire iron being engageable with said lever arm as pivotal movement of said lever arm proceeds in the same direction to restrict rearward pivoting movement of said tire iron with respect to said lever arm for imparting an inwardly directed thrust to said lip of said tire iron.
2. A tool for loosening the bead portions of a tire from the rim assembly of a vehicle wheel having a centrally disposed axle opening, said tool comprising
   (a) a base member adapted to lie beneath the tire and the vehicle wheel and to project radially outwardly therefrom beyond the periphery of the tire,
   (b) an upright cylindrical standard on said base member for extending through the centrally disposed axle opening of the vehicle wheel, said cylindrical standard having a diameter substantially conforming to the diameter of the axle opening for preventing substantial lateral movement of the vehicle wheel relative to said standard,
   (c) an elongate lever arm extending generally radially relative to said standard above and in vertically spaced relationship to said base member,
   (d) means pivotally connecting the inner end of said lever arm to the upper end portion of said standard for pivotal movement of said lever arm about its inner end downwardly toward and upwardly away from said base member, said means comprising
      (1) a connector link having an inner end portion and an outer end portion,
      (2) means pivotally connecting said connector link to the upper end portion of said standard for pivotal movement in opposite directions between a first position wherein said connector link projects substantially radially from said standard with said inner end portion thereof abutting the upper end portion of said standard and a second position wherein said connector link extends generally parallel to said standard, (3) removable means pivotally connecting said outer end portion of said connector link and the inner end of said lever arm for detachably connecting said lever arm to the upper end portion of said standard, and (4) said connector link being pivotally movable into said first position thereof and maintained therein by abutment with the upper end portion of said standard so that said connector link acts as a stationary substantially radially-projecting extension of said standard in response to pivotal movement of said lever arm about its inner end in a direction downwardly toward said base member, (e) a tire iron pivotally connected at its upper end to said lever arm intermediate the ends thereof and depending from said lever arm, and (f) said tire iron having an inwardly directed curved lip adapted to engage the bead portion of the tire adjacent the upwardly disposed rim of the vehicle wheel for subsequently forcing the bead portion of the tire downwardly and away from the upwardly disposed rim of the vehicle wheel in response to downward pivotal movement of said lever arm about its end connected to said standard.

References Cited by the Examiner
UNITED STATES PATENTS

| | | | |
|---|---|---|---|
| 1,208,184 | 12/1916 | Mayer | 157—1.22 XR |
| 2,545,483 | 3/1951 | Martin | 157—1.33 XR |
| 2,808,860 | 10/1957 | Hildebrant | 157—1.26 XR |
| 3,074,468 | 1/1963 | Tarazona | 157—1.24 |

FOREIGN PATENTS 278,166  1/1952  Switzerland.

GRANVILLE Y. CUSTER, JR., *Primary Examiner.*